United States Patent [19]

Hoffman et al.

[11] 4,061,783
[45] Dec. 6, 1977

[54] PACKAGED UNITS AND METHOD OF MAKING SAME

[76] Inventors: Louis S. Hoffman, Evans Farm Road, Morristown, N.J. 07960; Robert B. McCloskey, P.O. Box 208, Little Falls, N.J. 07424

[21] Appl. No.: 632,701

[22] Filed: Nov. 17, 1975

Related U.S. Application Data

[63] Continuation-in-part of Ser. No. 488,532, July 15, 1974, abandoned.

[51] Int. Cl.$^2$ .......................... A65B 5/04; A65B 25/00
[52] U.S. Cl. ....................................... 426/87; 47/48.5; 206/216; 426/115; 426/134; 426/383; 426/421
[58] Field of Search .......................... 426/106, 112–115, 426/124, 132, 134, 87, 91, 383, 421; 206/212, 216, 306, 423, 305, 449, 454–456, 464, 822; 47/48.5

[56] References Cited

U.S. PATENT DOCUMENTS

| | | | |
|---|---|---|---|
| 2,352,319 | 6/1944 | Harris | 206/42 |
| 2,834,456 | 5/1958 | Langer | 206/42 |
| 3,126,284 | 3/1964 | Howerin | 426/78 |
| 3,142,918 | 8/1964 | Offensend et al. | 206/454 X |
| 3,241,659 | 3/1966 | Segel | 206/82 |
| 3,387,699 | 6/1968 | Heller | 206/42 |
| 3,910,410 | 10/1975 | Shaw | 206/306 X |

FOREIGN PATENT DOCUMENTS

| | | | |
|---|---|---|---|
| 655,333 | 1/1963 | Canada | 426/134 |
| 601,141 | 7/1960 | Canada. | |
| 11,342 of | 1915 | United Kingdom | 206/456 |

*Primary Examiner*—William A. Cuchlinski, Jr.
*Attorney, Agent, or Firm*—Martin L. Faigus

[57] ABSTRACT

A thin, substantially flat packaged unit includes a thin, substantially flat utensil in a protective sheath. The protective sheath includes a flat rigidifying member of substantially the same thickness as the utensil and surrounding marginal edges of the utensil, and flexible sheet material overlying the utensil and adhered to the rigidifying member. In a preferred construction the utensil includes a substance that is interactable with a fluid, and the protective sheath encloses at least the section of the utensil including the substance.

A method of forming a thin, substantially flat packaged unit including a thin, substantially flat utensil in a protective sheath from a thin, substantially flat substrate and flexible sheet material. The method includes the steps of cutting the substrate inwardly of margins thereof to for the thin, flat utensil having marginal edges surrounded by portions of the substrate that constitute a rigidifying member of the protective sheath; and adhering the flexible sheet material to the rigidifying member in overlying relationship with the utensil, whereby the rigidifying member and flexible sheet material constitute the protective sheath for the utensil. In a preferred embodiment of this invention the utensil includes a substance which is interactable with a fluid, and this substance is provided on the utensil prior to adhering the flexible sheet material to the rigidifying member in overlying relationship with at least the section of the utensil which includes the substance. In the most preferred method of this invention the plurality of packaged units are formed from a single, substantially flat substrate and opposed flexible sheets by a continuous mass production method that employs the above described steps.

84 Claims, 9 Drawing Figures

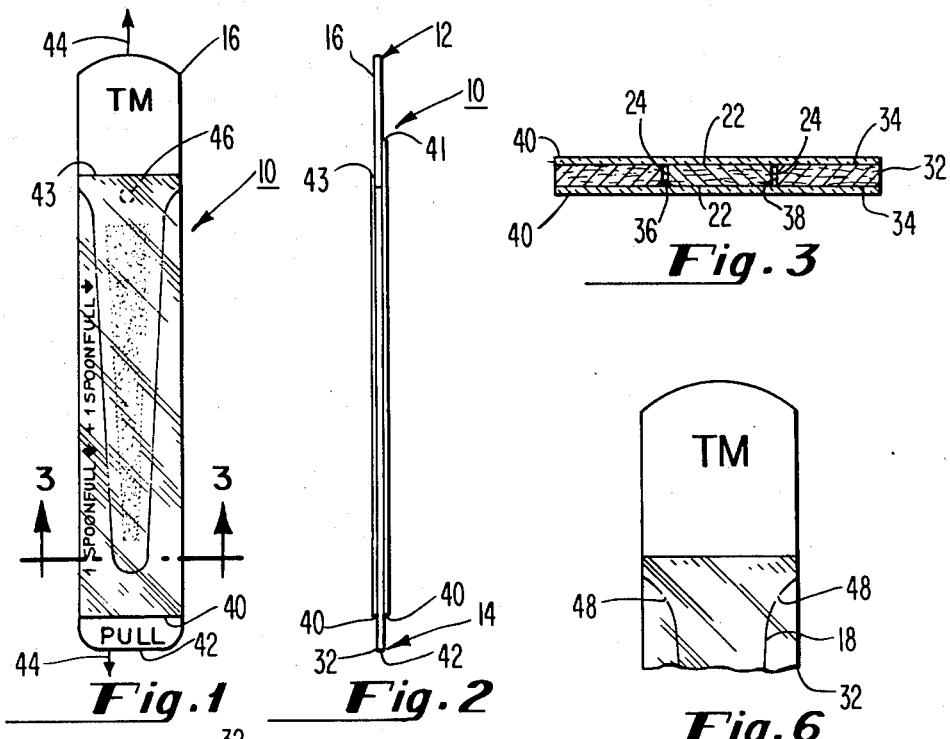
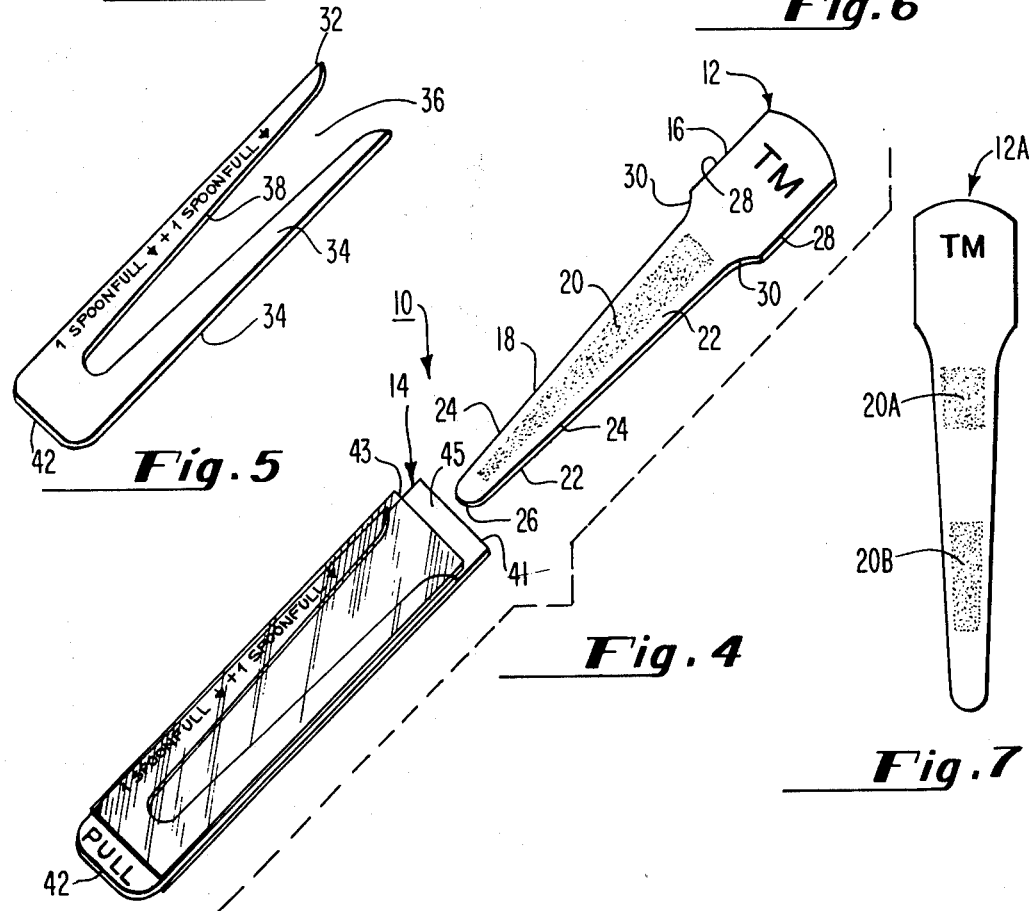

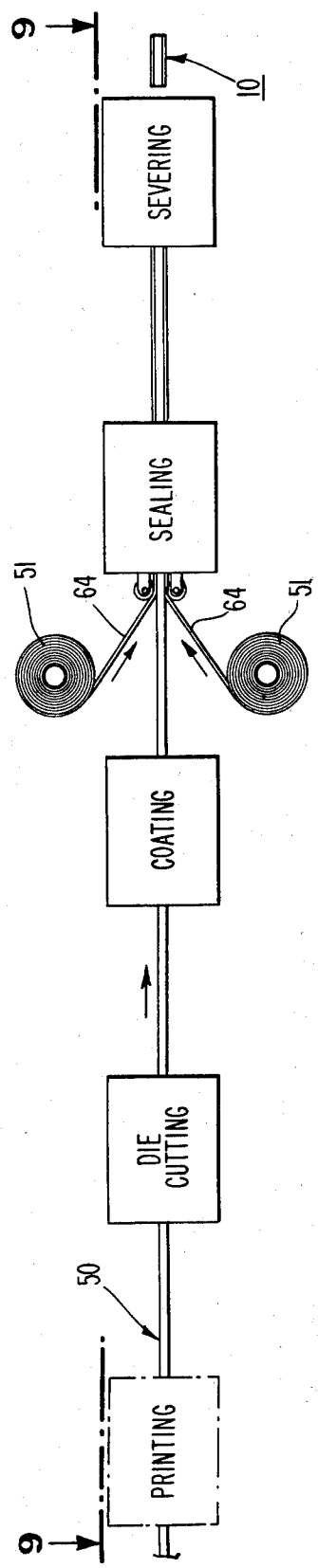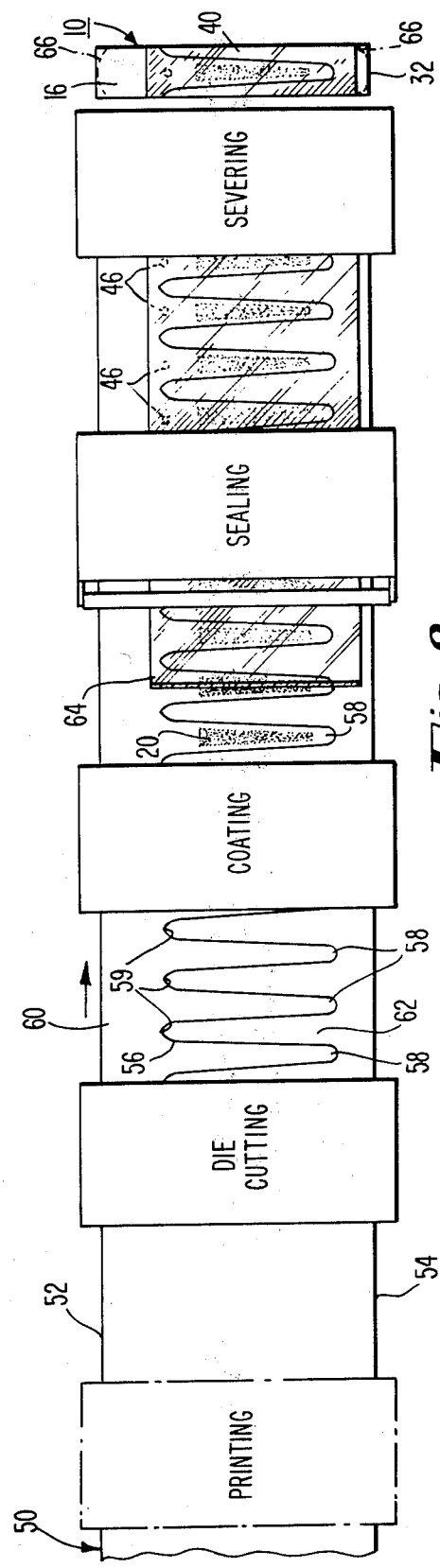

PACKAGED UNITS AND METHOD OF MAKING SAME

RELATED APPLICATIONS

This application is a continuation-in-part of U.S. Application Ser. No. 488,532, filed on July 15, 1974, and entitled Packaged Treating Units and Method of Making Same, and now abandoned.

BACKGROUND OF THE INVENTION

1. Field of the Invention

This invention relates to thin, substantially flat packaged units including a thin, substantially flat utensil in a protective sheath, and preferably to such a unit in which the utensil includes a substance that is interactable with a fluid. In addition, this invention relates to a method of making packaged units of the above described type, and most preferably, to a simple and economical mass production method for making a plurality of packaged units.

2. Description of the Prior Art

Representative prior art utensils including a substance which is interactable with a fluid are disclosed in Canadian Pat. No. 655,333 (Christensen) and U.S. Pat. Nos. 3,252,803 (Belasco), 3,312,555 (Rossi et al), 3,469,997 (Rossi et al), 3,154,418 (Lovell et al), 2,857,908 (Cornfield), 2,425,945 (Leach) and 3,035,925 (Jackson).

The Canadian Pat. No. (655,333) and the two Rossi et al Pat. Nos. (3,312,555 and 3,469,997) disclose utensils in which the substance that is interactable with a fluid is a dissolvable sweetening agent. The utensil disclosed in the Canadian patent is in the form of a spoon having a lower spatulate portion which is coated with the sweetening agent, and this spatulate portion can be covered by a thin protective wrapper which is sealed along marginal ends thereof. In the Rossi et al patents the sweetening agent is in the form of a block of sugar which is anchored to a handle, and the entire utensil is sealed within a conventional wrapper.

The wrappers for the utensils disclosed in the Canadian patent and the Rossi et al patents are formed solely of thin flexible materials. These wrappers do not provide a significant rigidifying function to protect the utensil from becoming deformed or otherwise damaged. Apparently the utensils envisioned in the Canadian patent and the two Rossi et al patents are considered to be sufficiently stiff so as to not require additional support from a protective wrapper.

From a process standpoint, the packaged units disclosed in the Canadian patent and the Rossi et al patents require the formation of the coated utensils completely separate and apart from the protective wrappers. Fairly sophisticated, low speed equipment is required to form packaged units in this manner, since the utensil and the wrapping material must be handled separately in a manner to insure the proper positioning of the utensil with respect to the wrapper.

The Belasco U.S. Pat. No. (3,252,803) discloses several different forms of utensil which can be provided with various different substances that are interactable with a fluid. The coatings disclosed in the Belasco patent are edible soluble substances in the form of separate solid particles, and can include such materials as instant food, instant beverages, drugs and medicines. Also, Belasco indicates that the surface to which the edible substances are applied may be made of different materials, such as paper, plastic, metal foil, glass, porcelain or wood. In addition, Belasco indicates that the surfaces can be in various forms including stirrers, spatulas, flat sheets, etc. Although Belasco indicates that the coated utensils provide a convenient and economical means by which the edible substances can be packaged and sold to the consuming public, he is completely silent with respect to a specific manner of packaging the utensils.

The Lovell et al U.S. Pat. No. (3,154,418) discloses utensils of the type including three-dimensional compartments for receiving substances which are interactable with fluids. Utensils including three-dimensional compartments of the type disclosed in the Lovell et al patent are generally thicker than, and occupy more space than the utensils contemplated by the instant invention. Openings into the compartment are sealed by a protective layer; generally in the form of a flexible, highly pliable sheet. This layer does not provide a significant supportive function for the utensil. The utensils disclosed in the Lovell et al patent are mass produced in a continuous operation; however, that operation is not concerned with providing a protective sheath that cooperates with a utensil in the manner contemplated by the present invention.

The patents to Leach U.S. Pat. No. (2,425,945) and Cornfield U.S. Pat. No. (2,857,908) relate to tongue depressors which include a confection, such as hard candy. These utensils are generally quite stiff and do not require additional support from a protective wrapper.

The Jackson U.S. Pat. No. (3,035,925) relates to packaged confectionary, such as lollipops, in which a plurality of separate units are included within a single protective member which is configured like a pack of matches. The packaged unit disclosed in Jackson is somewhat nonanalogous to the instant invention in which the packaged units include individual utensils which are separately supported within individual protective sheaths.

The packaged units disclosed in the patents to Welch U.S. Pat. No. (2,401,534), Hogan U.S. Pat. No. (2,993,313) and Leibow U.S. Pat. No. (2,812,577) relate to packaged units including uncoated utensils. The packaged units disclosed in the Welch and Hogan patents include conventional protective wrappers formed solely from thin flexible sheet materials. Such wrappers do not provide a significant supportive function. The patent to Leibow discloses a packet for supporting a plurality of spoon-type utensils therein. Accordingly, the packet disclosed in Leibow is somewhat nonanalogous to the instant invention in which each utensil is included within its own protective sheath.

The utensils disclosed in the Welch, Leibow and Hogan patents are all manufactured completely separate and apart from their protective wrappers. Therefore, these packaged units are subject to the same processing deficiencies described earlier in connection with the formation of coated utensils which are manufactured completely separate and apart from their protective wrappers.

U.S. Pat. No. 3,732,975 (Poncy) discloses the continuous formation of sterile packages including an outer protective member, and an inner hollow sheath that is removable from the protective member. The method disclosed in Poncy employs a laminate consisting of four layers of material, and requires heat sealing selected regions of the laminate together in order to simultaneously form the hollow sheath and protective member. The method disclosed in Poncy is somewhat nonanalogous to the method of the instant invention in which the utensil is provided by cutting a substrate, as opposed to laminating elements of a substrate together.

SUMMARY OF THE INVENTION

Packaged units of this invention are substantially thin, flat constructions. Specifically these units include a thin, substantially flat utensil in a protective sheath. The protective sheath includes a flat rigidifying member of substantially the same thickness as the utensil surrounding marginal edges of the utensil, and flexible sheet material overlying the utensil and adhered to the rigidifying member. Preferably the flexible sheet material is thinner than the utensil and the rigidifying member, and most preferably includes separate flexible sheets adhered to opposed surfaces of the rigidifying member in overlying relationship with opposed flat surfaces of the utensil.

Preferably the utensil is intended to be utilized with a fluid, and most preferably includes a substance which is interactable with the fluid, either chemically or physically. For example, the substance can be in the form of a coating or layer on the utensil which is dissolvable in the fluid for the purpose of treating it. An example of such a material is a sweetening agent such as sugar or saccharin. The substance can also be chemically interactable with the fluid. For example, the substance can include a pH indicator which chemically reacts with a fluid to indicate its acidity or basicity. Chemically interactable substances included on a utensil find wide use in the medical diagnostic area, such as in the testing of urine or blood.

When a substance that is interactable with a fluid is included on the utensil it can be formed within the utensil, or adhered as a coating or layer on the surface. In accordance with the broader aspects of this invention the utensil need not include any substance that is interactable with a fluid to be treated. However, the most preferred constructions do include some such substance. The specific substance which is included on the utensil is not deemed to be a limitation on the broader aspects of this invention.

In a preferred embodiment of this invention the utensil includes an upper gripping end and a lower end which is integral with, and extends downwardly from the gripping end. The lower end of the utensil is adapted to be employed in connection with a fluid, and most preferably includes a substance that is interactable with the fluid. Preferably the lower end of the utensil is tapered so that side margins converge toward each other in a direction from the gripping end to a lower rounded bottom of said utensil. In the preferred construction of this invention the flat rigidifying member of the protective sheath includes a recess extending inwardly from an upper margin for receiving the lower end of the utensil therein. When the lower end of the utensil is tapered the recess preferably is provided with complimentary shaped inner surface means for closely conforming to the margins of the lower end of the utensil. The lower end of the utensil is disposed within the recess with the opposed flat surfaces lying in substantially the same plane as respective opposed flat surfaces of the rigidifying member. The treating end is maintained in its position within the recess by flexible sheets which are adhered tautly to the opposed flat surfaces of the rigidifying member. When the inner surface means of the recess closely confines the marginal ends of the lower end of the utensil, said utensil is tightly confined within the protective sheath, and therefore is not subject to undesirable lateral movement within said sheath.

When the flexible sheets adhered to the rigidifying member are substantially thinner than said rigidifying member, the entire packaged unit is substantially flat and thin; approximating the thickness of the utensil and rigidifying member. Moreover, the lower end of the utensil is well protected by virtue of its confinement within the recess of the rigidifying member of the protective sheath.

In a preferred construction of the packaged unit, at least a portion of the gripping end of the utensil extends upwardly beyond upper margin of the flexible sheets of the protective sheath, and the rigidifying member includes a downwardly extending segment below a bottom margin of the lower end of the utensil. This construction permits easy removal of the utensil from the sheath by engaging the gripping end of the utensil at the exposed portion thereof, and engaging the protective sheath in the region of the downwardly extending segment of the rigidifying member, and pulling in opposite directions to remove the utensil from the sheath. Accordingly, the protective sheath remains intact after the utensil has been removed, and therefore can be reused to accommodate the utensil in the event that it can be utilized for more than a single application.

In a preferred construction of this invention the utensil is attached to the protective sheath to provide a visible indication as to whether the packaged unit has been tampered with by removal of the utensil from the sheath prior to sale or intended first use.

In a preferred embodiment of this invention a fluid-dissolvable substance is included on the lower end of the utensil, and preferably is coated on at least one surface thereof. This substance can be any material which is dissolvable in a fluid, for either treating the fluid, or for treating a compound or material associated with the fluid. For example, the coating may be a fertilizer, or other type of plant food, which is dissolvable in moisture associated with soil to treat the soil for enhancing plant growth. Alternatively, the fluid-dissolvable treatment coating may include may of the ingredients referred to in the Belasco U.S. Pat. No. (3,252,803). In the most preferred embodiment of this invention, the treatment coating is in the form of an artificial sweetener to sweeten a liquid, and the lower end of the utensil has sufficient flexure rigidity to also be employed as a stirrer for the liquid.

The utensil and rigidifying member of the protective sheath can be formed from many different materials. However, when a substance is adhered to the utensil the material of the utensil preferably is compatible with the substance so that it can be adhered to it. Alternatively, the substance adhered to the utensil, and the material of the utensil can be compatible with a separate adhesive employed to retain the substance on the utensil. Also, the material should be relatively inexpensive to provide for economical construction of the packaged unit; and in environments wherein toxicity may be a problem, the material should be non-toxic. In addition, the material from which the utensil is formed should be of sufficient structural integrity and rigidity for its intended use. For example, when the utensil constitutes a stirrer with a coating of an artificial sweetener on the lower end thereof, the lower end should have sufficient rigidity to perform its stirring function. If it is desired to print identifying indicia on the substrate, such as a trademark, list or type of ingredients, or measurement units, at least one surface of the substrate should be of a printing grade capable of retaining printed indicia thereon which can be applied to the surface by well known commercial printing operations. Exemplary materials from which the utensil and flat rigidifying member can be formed are clay-coated cardboard, heavy paper stock, plastic, foil coated cardboard, laminates of plastic and paper, laminates of paper alone, and laminates of plastic alone.

The utensil and rigidifying member of the protective sheath are relatively thin; generally less the 1/16 of an inch, and preferably less than 1/32 of an inch. In a preferred embodiment of this invention the thickness of the substrate is from about 10 mils to about 50 mils; and in the most preferred embodiment the thickness is from about 15 mils to about 30 mils.

The flexible sheets which are adhered to the rigidifying member are preferably exceedingly thin; generally less than 2 mils in thickness, and preferably no greater than 1.5 mils in thickness. The specific material of the flexible sheets does not constitute a limitation on the invention. However, the flexible sheets must either be capable of being heat sealed to the rigidifying member, or alternatively, the flexible sheets must be compatible with an adhesive that is also compatible with the rigidifying member so that the flexible sheets can be adhered to said rigidifying member through the use of said adhesive. Most preferably, the flexible sheets are transparent, and can include such materials as polystyrene film and heat-sealable Cellophane. When heat-sealable Cellophane is employed the flat rigidifying member can be of a clay coated cardboard stock with a varnish applied to one surface thereof so that the Cellophane can be heat sealed thereto. It is particularly desirable to employ transparent flexible sheets when the rigidifying member of the protective sheath includes printed indicia thereon which should desirably be viewable by a user of the packaged unit.

A method of forming a packaged unit including a thin, substantially flat utensil in a protective sheath from a thin, substantially flat substrate and flexible sheet material also forms a part of this invention. The method includes the steps of cutting the substrate inwardly of margins thereof to form a thin, substantially flat utensil surrounded by portions of the substrate that constitute a rigidifying member of the protective sheath; and adhering the flexible sheet material to the rigidifying member in overlying relationship with the utensil, whereby the rigidifying member and flexible sheet material constitute the protective sheath for the utensil. In a preferred embodiment of this invention the utensil includes a substance which is interactable with a fluid, and the substance is provided on the utensil prior to adhering the flexible sheet material to the rigidifying member in overlying relationship with at least the section of the utensil which includes the substance.

In accordance with a preferred aspect of the method of this invention the utensil and rigidifying member of the protective sheath are formed by cutting the substrate intermediate upper and lower margins thereof to form a lower end of the utensil surrounded by sections of the substrate constituting the rigidifying member. The lower end remains attached to an upper segment of the substrate that constitutes an upper gripping end of the utensil. When a coating is to be included on the lower end of the utensil it preferably is applied to at least a portion of at least one flat surface of the substrate in a region constituting the lower end of said utensil. Subsequent to forming and coating the lower end of the utensil the flexible sheet material, which preferably includes a pair of flexible sheets, is positioned in a taut condition in overlying relationship with each of the flat surfaces of the lower end of the utensil and adhered to opposed flat surfaces of a portion of the substrate constituting the rigidifying member to thereby complete the formation of the packaged unit.

According to the most preferred method of this invention a plurality of packaged units are manufactured in large quantities by a mass production method, to thereby reduce the cost of manufacturing the units. Preferably, the mass production method includes the steps of cutting a transversely extending substrate intermediate upper and lower margins thereof to form a plurality of spaced lower ends of the utensils, said spaced lower ends being surrounded by a continuous, transversely extending lower segment of the substrate which will constitute the rigidifying members of the protective sheaths in the completely formed packaged units. In addition, the transversely spaced lower ends of the utensils are integral with a continuous, transversely extending upper segment of the substrate which will constitute the upper gripping ends of the utensils in the completely formed packaged units. When a fluid interactable substance is to be applied to the utensils it is applied to at least one flat surface of the substrate in transversely spaced locations corresponding to regions in which the lower ends of the utensil are formed, and a pair of flexible sheets are adhered to the transversely extending continuous lower segment of the substrate. After the flexible sheets have been adhered to the substrate, the substrate, with the flexible sheets adhered thereto is separated into discrete packaged units by severing the substrate along lines intermediate adjacent side margins of adjacent lower ends of the utensils.

Other objects and advantages of this invention will become apparent upon reading the detailed description which follows, taken in conjunction with the drawings.

BRIEF DESCRIPTION OF THE DRAWINGS

FIG. 1 is a plan view of a packaged unit according to this invention;

FIG. 2 is an enlarged side elevation view of the packaged unit of FIG. 1;

FIG. 3 is an enlarged sectional view taken along line 3—3 of FIG. 1;

FIG. 4 is an isometric view of a packaged unit according to this invention showing the utensil separated from the protective sheath;

FIG. 5 is an isometric view of the flat rigidifying member of the protective sheath;

FIG. 6 is a fragmentary plan view of an alternative embodiment of a packaged unit according to this invention;

FIG. 7 is a plan view of an alternative construction of a utensil employed in the packaged unit of this invention;

FIG. 8 is a side elevation view showing schematically the method steps employed in a mass production method for forming packaged units according to this invention; and FIG. 9 is a plan view taken along line 9—9 of FIG. 8.

DESCRIPTION OF THE PREFERRED EMBODIMENTS OF THE INVENTION

As explained earlier, the packaged units of this invention include a substantially flat utensil which can include many different substances that are interactable with a fluid, either physically or chemically. Moreover, in accordance with the broadest aspects of this invention the utensil can be free of any such substance. However, for purposes of simplicity, the preferred embodiments of this invention (both article and method) will be described in connection with a packaged unit in which the utensil is coated with a sweetener, such as saccharin, and is employed to both stir and sweeten a beverage, or other liquid.

Referring to FIGS. 1–5, and specifically to FIG. 4, one embodiment of a packaged unit 10 according to this invention includes a thin, substantially flat untensil 12 and a protective sheath 14.

The utensil 12 preferably is less than 1/16 of an inch thick, and more preferably less than 1/32 of an inch thick. A preferred thickness range for the utensil 12 is from between about 10 mils and about 50 mils; the most preferred range being from about 15 mils to about 30 mils. The utensil 12 includes an upper gripping end 16 which is integral with a lower, downwardly extending end 18 which, preferably, has a greater length than the gripping end 16 to accommodate a desired amount of sweetener in the form of a substantially thin layer. A liquid-dissolvable sweetening agent 20, such as saccharin, is adhered to at least one of the opposed flat surfaces of the tapered treating end 18 of the utensil 12. The treating end 18 is preferably narrower than the gripping end 16 and includes downwardly extending converging side margins 24 terminating in a bottom margin 26 which is preferably rounded. The side margins 24 of the treating end 18 are joined to side margins 28 of the upper gripping end 16 through generally curved margins 30. The tapered construction of the treating end 18 facilitates separation of the utensil 12 from the protective sheath 14.

Referring to FIGS. 2 through 5, the protective sheath 14 is a laminated construction including an intermediate, substantially flat rigidifying member 32 having substantially the same thickness as the utensil 12 (FIGS. 3 and 5). In fact, the utensil 12 and the intermediate flat rigidifying member 32 of the protective sheath 14 are preferably formed from the same substrate according to a mass production method which will subsequently be described in connection with FIGS. 8 and 9.

Referring to FIGS. 2 and 5, the intermediate flat rigidifying member 32 has opposed flat surfaces 34, and includes a tapered recess 36 therein which is defined by contoured inner surface means 38. Referring to FIGS. 2 through 4, a pair of flexible sheets 40, which are substantially thinner and more flexible than the intermediate rigidifying member 32, are adhered in a taut condition to opposite flat surfaces 34 of said rigidifying member. The flexible sheets 40 overlie the tapered recess 36 to complete the construction of the protective sheath 14. Preferably, the flexible sheets 40 have a thickness of less than 2 mils, and more preferably, no greater than about 1.5 mils.

Referring to FIGS. 1 and 3, the lower tapered treating end 18 of the utensil 12 is disposed within the tapered recess 36 of the flat rigidifying member 32 between the pair of flexible sheets 40. The opposed flat surfaces 22 of the treating end lie in substantially the same plane as corresponding opposed flat surfaces 34 of the rigidifying member 32, and the tapered side margins 24 of the treating end 18 of the utensil are closely adjacent the contoured inner surface means 38 (FIG. 3). The bottom margin 26 of the treating end 18 is likewise closely positioned to the inner surface means 38 defining the tapered recess 36.

In view of the fact that the flexible sheets 40 are substantially thinner than the intermediate flat rigidifying member 32 the entire packaged treating unit 10 is of a substantially flat construction with the major contribution to its thickness being provided by the utensil 12 and rigidifying member 32.

Referring to FIGS. 1 and 2, a preferred construction of a packaged treating unit 10 is shown in which the upper gripping end 16 of the utensil 12 extends upwardly beyond upper margins 41 and 43 of the flexible sheets 40 to provide an exposed portion of the gripping end which is adapted to be engaged for aiding in separating the utensil 12 from the protective sheath 14. In addition, the protective sheath has a downwardly extending segment between the lowermost margin of the recess 36 and a bottom margin 42 of the protective sheath 14 which is also adapted to be engaged to aid in the separating operation. The utensil 12 is separated from the protective sheath 14 by pulling the utensil and protective sheath in opposite directions as indicated by arrows 44 in FIG. 1. The tapered relationship between the treating end 18 of the utensil and the recess 36 of the protective sheath 14 renders the separating operation quite easy. The utensil 12 can then be utilized to stir and sweeten a beverage, and, in the event that the entire coating is not utilized in a single application, the utensil 12 can be reinserted into the protective sheath 14 for subsequent use.

Referring to FIGS. 2 and 4, a preferred construction of the protective sheath 14 is shown which permits easy reinsertion of the utensil 12 into said protective sheath. Specifically, the upper margin 41 of one of the flexible sheets 40 extends beyond the upper margin 43 of the other flexible sheet to provide an exposed inner flat surface section 45 which functions as a guiding surface for the treating end 18 of the utensil 12 as said treating end is reinserted into the protective sheath 14.

In a preferred embodiment of the packaged treating unit 10 the flat utensil 12 is positively secured to the protective sheath 14. Referring specifically to FIG. 1, one means of securing the utensil 12 to the protective sheath 14 is through a spot bond, or tack 46 between one flexible sheet 40 of the protective sheath 14 and a flat surface 22 of the utensil 12. This tack provides a visible indication as to whether the packaged treating unit 10 has been tampered with prior to purchase or use. Stating this another way, if the packaged treating unit 10 has been tampered with by the separation of the utensil 12 from the protective sheath 14 the tack 46 will have been broken, to thereby indicate that the packaged treating unit had been tampered with.

It should be understood that the track 46 is only a representation of the type of bond which can be effected between the flexible sheet 40 and a flat surface 22 of the utensil. It is within the scope of this invention to include other bond constructions, such as a thin, transversely extending bond line between the flexible sheet 40 and a flat surface 22 of the utensil 12. However, the bond should not be so strong as to prevent separation of the utensil from the protective sheath in the manner described earlier in this application.

Referring to FIG. 6, an alternative arrangement for connecting the utensil 12 to the protective sheet 14 is shown. In this embodiment, a continuous tab connection 48 is maintained between the treating end 18 of the utensil and the rigidifying member 32 of the protective sheath 14. The method of forming this connection will be described later. If the utensil 12 has been removed from the protective sheath 14 prior to sale, the continuous tab connection 48 will have been broken to provide a visible indication that the packaged treating unit 10 had been tampered with.

Referring to FIG. 7, an alternative embodiment of a utensil 12A is shown in which the coating of artificial sweetener is applied in separate, discrete segments 20A and 20B, with each segment being equivalent to a given amount of sugar, such as one teaspoonful. Alternatively, each of the segments 20A and 20B can be of a different substance. For example, one of the segments can be a sweetener and the other segment can be a lemon flavoring so that the utensil 12A can be used to both sweeten and add flavor to a beverage, such as tea.

As explained earlier, the packaged treating unit 10 of this invention can include printed indicia thereon, such as measuring indicia to indicate the amount of sweetening agent, as measured from the bottom margin 26 of the treating end, which is equivalent to a given quantity of sugar, such as one teaspoonful. Referring to FIG. 5, such printed indicia is shown as being included on the rigidifying member 32, and this indicia can be utilized with either the utensil 12 shown in FIGS. 1 through 5, or the utensil 12A shown in FIG. 7. In addition, the printed indicia can including a list of ingredients, trademarks, or any other desired information. If desired, the printed indicia can be reverse printed on the inside surface of a flexible sheet 40, or it can be directly printed on the outside surface of said flexible sheet. When the printed indicia is on the rigidifying member 32, or reverse printed on a flexible sheet 40, the flexible sheet should be transparent so that the indicia is visible.

An illustrative embodiment of a packaged treating unit 10 will now be described, but is not intended to be limiting on the broadest aspects of this invention.

EXAMPLE

An illustrative packaged treating unit 10 of this invention is approximately 0.030 inches thick, has a length of approximately 4¼ inches and has a substantially uniform width of approximately ⅜ of an inch. The treating utensil 12 and rigidifying member are both formed from clay coated bleached sulfate board stock having a thickness of approximately 0.024 inches, and the flexible sheets 40 are each 0.0015 inch thick polystyrene film (TRICYITE - Dow Chemical Company). The coating 20 is a thin layer of saccharin adhered to one surface 22 of the utensil 12 by a starch binder.

The treating utensil 12 is approximately 3¾ inches long. The gripping end 16 of the utensil 12 is approximately 1 inch long and the treating end 18 of said utensil is approximately 2¾ inches long. The protective sheath 14 is approximately 3¼ inches long with the recess 36 terminating approximately ½ inch from the bottom margin 42 of said protective sheath.

Referring to FIGS. 8 and 9, a preferred mass production method according to this invention for forming a plurality of packaged treating units 10 will be described. A thin, substantially flat substrate 50 preferably has a printing grade surface associated therewith. Accordingly, the substrate is first passed through a printing station at which any desired identifying indicia can be printed thereon by various commercially available printing devices. The printed indicia can include a list of ingredients, trademarks, measuring information, etc. It should be understood that the printing operation is entirely optional, and in many instances it may not be desired to print the packaged treating unit in any manner. The printing step of the method is depicted in phantom to indicate the optional nature thereof.

The substrate 50, having upper and lower edges 52 and 54, respectively, (FIG. 9) is directed through a die cutting operation at which the substrate 50 is cut in a substantially serpentine fashion through the thickness thereof along line 56 intermediate the upper and lower edges 52 and 54 of said substrate 50. In this manner a plurality of transversely spaced, tapered tongue-like elements 58. These tapered elements 58 will constitute the tapered treating ends 18 of the utensils 12 in the completed packaged treating units 10. The tapered elements 58 are continuous downward extensions of a continuous, transversely extending upper element 60 of the substrate 50. This transversely extending upper segment 60 will constitute the upper gripping ends 16 of the utensils in the completed packaged treating units 10. In addition, the downwardly extending tapered elements 58 are surrounded by a continuous, transversely extending lower segment 62 which will constitute the intermediate flat rigidifying members 32 of the protective sheaths 14 in the completed packaged treating units 10.

After the die cutting operation, the substrate 50 is directed past a coating station at which a fluid dissolvable treatment coating 20 (or 20A and 20B - FIG. 7), such as for example saccharin or other artificial sweetener, is applied to the downwardly extending tapered elements 58. According to one preferred embodiment of this invention the saccharin is applied to the tapered elements 58 by first applying a starch solution to the substrate 50 by a silk screening operation, and then dusting the saccharin onto the starch, whereby the starch bonds the saccharin to the tapered elements 58. Both the starch and saccharin are dissolvable in liquids to be sweetened. Alternatively, the starch can be intimately mixed with the saccharin, or other suitable sweetener, and the starch sweetener composition can be applied to the tapered elements 58 by any conventional means, such as by a gravure-type printing operation. The specific method by which the coating is applied to the tapered elements 58 is not considered to be a limitation on the present invention.

After the substrate 50 has passed the coating station, flexible sheets 64 are directed from rolls 51 into engagement with opposed flat surfaces of the substrate 50 and the composite is directed through a sealing operation. The flexible sheets 64 will constitute the flexible sheets 40 of the protective sheaths 14 in the complete packaged treating units 10. If the flexible sheets 64 are compatible for heat sealing with the substrate 50, the sealing operation may include only heated dies to heat the flexible sheets 64 and press them against the transversely extending lower segment 62 of the substrate which surrounds the tapered elements 58. Alternatively, if the flexible sheets 64 cannot be heat sealed to the substrate 50, an adhesive can be applied to the transversely extending lower segment 62 prior to directing the flexible sheets 64 into engagement with the substrate 50. If an adhesive is employed, the sealing station may merely constitute a heating oven to cause the adhesive to cure or set, and thereby firmly affix the flexible sheets 64 to the opposed flat surfaces of the substrate 50. Also, adhesive tacks 46 can be applied at the sealing station to adhere at least one of the flexible sheets 64 to the substrate 50 to provide the tamperproof indicator for the completed packaged treating units 10.

After the sealing operation the substrate 50, with the flexible sheets 64 adhered thereto, is directed past a severing station at which the substrate is severed intermediate adjacent side margin of adjacent tapered elements 58 to form the individual packaged treating units 10. Referring to FIG. 9, the adjacent side margins of adjacent tapered elements 58 are continuously connected through curved cut sections 59 which will constitute the curved margins 30 joining the side margins 24 of the treating ends 18 of the utensils 12 to the side margins 28 of the upper gripping ends 16 of said utensils (FIG. 1).

The severing operation can be performed by a die cutting operation, which, in addition to severing the individual treating units 10 from the composite, can form rounded, or other shaped upper and lower margins on the individual treating units 10, as representatively indicated by dotted lines 66 in FIG. 9. Alternatively, shaped upper and lower margins can be provided by a die cutting operation performed prior to the substrate reaching the severing station (e.g. simultaneous with the die cutting of the serpentine-shaped line 56), and the severing station can include conventional cutting knives to cut completely through the thickness of the substrate along a substantially straight line to separate discrete packaged treating units 10 from the composite.

In order to form the alternative embodiment of the packaged treating unit shown in FIG. 6, the initial die cutting operation which forms the downwardly extending tapered elements 58 is performed with a die having a cutting surface interrupted by notches so that the die cut line 56 is interrupted to leave the continuous tab connections 48 shown in the FIG. 6 embodiment.

It is within the scope of this invention to vary the order of the method steps and also to perform more than one step simultaneously. For example, the coating operation can be performed prior to, or simultaneously with the cutting operation in which the tapered tongue-like elements 58 are formed. Also, if the printing step is employed it can be carried out at any time prior to adhering the flexible sheets 64 to the substrate 50.

It is preferred to sever the discrete packaged treating units 10 from a transversely extending composite as the last step in the continuous mass production operation. However, according to the broadest aspect of this method invention, a single discrete packaged treating unit 10 can be formed from a substrate 50 having a transverse dimension equal in width to that of said single discrete packaged treating unit; in which case the packaged treating unit 10 will not have to be separated from a composite construction having a transverse dimension greater than that of the packaged treating unit.

Unless indicated to the contrary in the method claims, the order in which the method steps are set forth in said method claims shall not be considered to be the sequential order in which said steps are necessarily performed.

Having described our invention, we claim:

1. A packaged unit including a thin, substantially flat utensil having an upper gripping end and a lower end, having a different configuration than said upper end, extending downwardly therefrom, said lower end being integral with and longer than said gripping end, said lower end being interactable with a fluid and being in a protective sheath which includes (a) a substantially flat rigidifying member of substantially the same thickness as the lower end of the utensil and having a recess extending inwardly from an upper margin for receiving the lower end of said utensil, and (b) flexible sheet material adhered to opposed flat surfaces of the rigidifying member and overlying the recess and opposed flat surfaces of the lower end of the utensil.

2. The packaged unit according to claim 1, wherein the flexible sheet material is thinner than the rigidifying member.

3. The packaged unit according to claim 2, wherein said flexible sheet material includes separate sheets adhered to the opposed flat surfaces of the rigidifying member.

4. The packaged unit according to claim 3, wherein the lower end of said utensil includes a substance that is interactable with said fluid.

5. The packaged unit according to claim 4, wherein said substance is dissolvable in a fluid.

6. The packaged unit according to claim 4, wherein said substance is physically interactable with a fluid.

7. The packaged unit according to claim 4, wherein said substance is chemically interactable with a fluid.

8. The packaged unit according to claim 4, wherein said substance is adhered to at least one flat surface of the lower end of the utensil.

9. The packaged unit according to claim 8, wherein said substance is physically interactable with a fluid.

10. The packaged unit according to claim 8, wherein said substance is chemically interactable with a fluid.

11. The packaged unit according to claim 8, wherein said substance is a coating that is dissolvable in a fluid.

12. The packaged unit according to claim 11, wherein said coating is an artificial sweetener, and said coated lower end constitutes a sweetener dispenser and a stirrer for a liquid to be treated.

13. The packaged unit according to claim 11, wherein said coating is disposed in at least two discrete segments spaced from each other along the length of the lower end of the utensil, each segment being substantially equivalent to a certain amount of material.

14. The packaged unit according to claim 4, wherein the thickness of the utensil and rigidifying member is between about 0.010 inches and about 0.050 inches, and the thickness of each flexible sheet forming a part of the protective sheath is no greater than about 0.002 inches.

15. The packaged unit according to claim 4, wherein cooperating surfaces of the lower end of the utensil and the recess in the rigidifying member are configured to permit easy removal of the utensil from the protective sheath.

16. The packaged unit according to claim 1, wherein the lower end of said utensil includes a substance that is interactable with said fluid.

17. The packaged unit according to claim 16, wherein the lower end of the utensil has smaller transverse dimension than the gripping end.

18. The packaged unit according to claim 17, wherein the recess in the rigidifying member includes an inner surface which is complimentary in shape to the section of the lower end which is received within it.

19. The packaged unit according to claim 16 wherein the gripping end of the utensil extends upwardly beyond upper margins of the protective sheath when the lower end of the utensil is fully within the recess of the ridigifying member.

20. The packaged unit according to claim 19, wherein said rigidifying member includes a bottom margin spaced from a lower extremity of the recess to define a downwardly extending flat gripping section, whereby said utensil is removable from the protective sheath by gripping the portion of the gripping end of the utensil which extends beyond the upper margins of the protective sheath and the downwardly extending gripping section of the rigidifying member and pulling said protective sheath and utensil in opposite directions.

21. The packaged unit according to claim 16, including attachment means between the utensil and protective sheath to provide a visible indicator as to whether the unit has been tampered with.

22. The packaged unit according to claim 16, wherein the maximum thickness of said packaged unit is less than 1/16 of an inch.

23. The packaged unit according to claim 1, wherein the transverse dimension of the gripping end of the utensil is substantially equal to the transverse dimension of the protective sheath.

24. A packaged unit according to claim 1, wherein said flexible sheet material is continuous and uninterrupted in the region overlying the utensil.

25. A thin, substantially flat packaged unit comprising:
A. a thin, substantially flat utensil having an upper gripping end and a downwardly extending lower end integral with said gripping end, said lower end including side margins which converge toward each other in a direction from said gripping end to a bottom margin of the lower end;
B. a protective sheath enclosing the lower end of the utensil, said protective sheath including;
  1. a substantially flat rigidifying member of substantially the same thickness as the lower end of the utensil, said rigidifying member having a contoured inner surface means through the thickness thereof defining a recess in said rigidifying member, and
  2. flexible sheets adhered to opposed flat surfaces of the rigidifying member and overlying the recess in the rigidifying member whereby said sheets cooperate with the rigidifying member to form a protective compartment in which the lower end of the utensil is disposed.

26. The packaged unit according to claim 25, wherein the flexible sheets are thinner than the rigidifying member.

27. The packaged unit according to claim 26, wherein the lower end of the utensil includes a substance that is interactable with a fluid.

28. The packaged unit according to claim 27, wherein said substance is dissolvable in a fluid.

29. The packaged unit according to claim 27, including a substance that is interactable with a fluid adhered to at least one flat surface of the lower end of the utensil.

30. The packaged unit according to claim 29, wherein said substance is physically interactable with a fluid.

31. The packaged unit according to claim 29, wherein said substance is chemically interactable with a fluid.

32. The packaged unit according to claim 29, wherein said substance is a coating that is dissolvable in a fluid.

33. The packaged unit according to claim 32, including identifying indicia on the protective sheath for indicating units of the coating as measured from the bottom margin of the lower end of the utensil.

34. The packaged unit according to claim 33, wherein said identifying indicia is on the rigidifying member of the protective sheath.

35. The packaged unit according to claim 27, wherein said substance is physically interactable with a fluid.

36. The packaged unit according to claim 27, wherein said substance is chemically interactable with a fluid.

37. The packaged unit according to claim 27, wherein one flexible sheet of the protective sheath has an upper margin which is positioned below an upper margin of the other flexible sheet.

38. The packaged unit according to claim 27, wherein said utensil and rigidifying member have a greater flexure strength than said flexible sheets.

39. The packaged unit according to claim 27, wherein the maximum thickness of the packaged unit is less than 1/16 of an inch.

40. The packaged unit according to claim 39, wherein the thickness of the utensil and ridigifying member is between about 0.010 inches and about 0.050 inches, and the thickness of each flexible sheet forming a part of the protective sheath is no greater than about 0.002 inches.

41. The packaged unit according to claim 27, wherein the lower end of the utensil is of a greater length than said gripping end.

42. The packaged unit according to claim 41, wherein said substance is a fluid-dissolvable coating disposed in at least two discrete segments spaced from each other along the length of the lower end of the utensil, each segment being substantially equivalent to a certain amount of material.

43. The packaged unit according to claim 42, wherein at least one discrete segment is a different coating than another of said discrete segments.

44. The packaged unit according to claim 42, wherein said coating is an artificial sweetener, and each discrete segment thereof is substantially equivalent to a spoon unit of sugar.

45. The packaged unit according to claim 27, including attachment means between the utensil and protective sheath to provide a visible indicator as to whether the unit has been tampered with.

46. The packaged unit according to claim 45, wherein said attachment means includes a bonded connection between the utensil and at least one of the flexible sheets of the protective sheath.

47. The packaged unit according to claim 45, wherein said attachment means includes at least on continuous connecting tab integral with the utensil and rigidifying member of the protective sheath; the flexible sheets of the protective sheath being transparent so that the connecting tab is viewable.

48. The packaged unit according to claim 27, wherein said rigidifying member includes a bottom margin spaced from a lower extremity of the recess to define a downwardly extending segment of the protective sheath between said lower extremity and said bottom margin; at least a portion of the gripping end of the utensil being exposed by extending upwardly beyond upper margins of the flexible sheets of the protective sheath, whereby said utensil is removable from the protective sheath by gripping the exposed portion of the gripping end of the utensil and the sheath in the region of the downwardly extending segment of the rigidifying member, and pulling said protective sheath and utensil in opposite directions.

49. The packaged unit according to claim 48, wherein the side and bottom margins of the lower end of the utensil are closely confined by the coutoured inner surface means of the rigidifying member.

50. The packaged unit according to claim 49, wherein said substance is a coating that is dissolvable in a liquid to be treated.

51. The packaged unit according to claim 50, wherein said coating is an artificial sweetener, and said coated end of the utensil constitutes a sweetener dispenser and stirrer for a liquid to be treated.

52. The packaged unit according to claim 35, wherein said flexible sheets are continuous and uninterrupted in the region overlying the recess in the rigidifying member.

53. A method of forming a packaged unit including a thin, substantially flat utensil in a protective sheath, said packaged unit being formed from a thin, substantially flat substrate and flexible sheet material; said method comprising the steps of:
  A. cutting the substrate inwardly of marginal ends thereof to form a thin, substantially flat utensil surrounded by portions of the substrate constituting a rigidifying member of the protective sheath; and
  B. adhering the flexible sheet material to the rigidifying member in overlying relationship with the utensil to form, with said rigidifying member, the protective sheath.

54. The method according to claim 53, wherein said flexible sheet material is a pair of flexible sheets, and the step of adhering the flexible sheets to the rigidifying member is carried out by adhering them to opposed, substantially flat surfaces of the rigidifying member in overlying relationship with opposed, substantially flat surfaces of the utensil.

55. The method according to claim 54, including the step of providing a substance that is interactable with a fluid on regions of the substrate constituting the utensil prior to adhering both flexible sheets to the rigidifying member.

56. The method according to claim 54, wherein said substance is provided by applying it to at least one substantially flat surface of the substrate in a region constituting the utensil prior to adhering both flexible sheets to the portions of the substrate surrounding said utensil.

57. The method according to claim 56, wherein said substance is applied by coating it on said at least one surface.

58. The method according to claim 57, wherein said coating is a fluid-dissolvable substance.

59. The method according to claim 54, including forming the utensil with an upper gripping end extending outwardly beyond the protective sheath.

60. A method of forming a packaged unit including a utensil and a protective sheath, said utensil including a lower end which is protected by a sheath and an upper gripping end, said unit being formed from a thin, substantially flat substrate and a pair of flexible sheets; said method comprising the steps of:
  A. cutting a portion of the substrate intermediate its upper and lower margins to form the lower end of the utensil which remains integral with an upper end of the substrate that constitutes the upper gripping end of the utensil, said lower end of the utensil being surrounded by a lower segment of the substrate; and
  B. adhering flexible sheets to opposed, substantially flat surfaces of the lower segment of the substrate surrounding the lower end of the utensil and in overlying relationship with said lower end to form, with the substrate, the protective sheath.

61. The method according to claim 60, including the step of providing a substance which is interactable with a fluid on the substrate in a region constituting the lower end ot the utensil prior to adhering both flexible sheets to the lower segment of the substrate.

62. The method according to claim 61, wherein said substance is provided by adhering it to at least one flat surface of the substrate in a region constituting the lower end of the utensil.

63. The method according to claim 62, wherein said substance is applied to coating it on said at least one flat surface of the substrate.

64. The method according to claim 63, wherein said substance is a coating of a fluid-dissolvable material.

65. A method of forming a plurality of packaged units, each unit including a utensil in a protective sheath and each utensil including an upper gripping end and a lower end extending generally downwardly from the gripping end; said packaged units being formed from a thin, substantially flat substrate and a pair of flexible sheets; said method comprising the steps of:
  A. cutting the substrate intermediate upper and lower margins thereof to form a plurality of spaced lower ends of the utensils, the lower ends being continuous downwardly directed extensions of a continuous, transversely extending upper segment of the substrate, and the lower ends being surrounded by a continuous transversely extending lower segment of the substrate;
  B. positioning the flexible sheets in overlying relationship with the opposed, substantially flat surfaces of each of the lower ends and the lower segment of the substrate;
  C. adhering the flexible sheets to opposed, substantially flat surfaces of the lower segment of the substrate in the regions surrounding each of the lower ends of the utensils; and
  D. severing the substrate and adhered flexible sheets between the transversely spaced lower ends of the utensils to form the plurality of packaged units, each packaged unit including a utensil in which the gripping end includes a portion of the upper segment of the substrate and the protective sheath includes a portion of the lower segment of the substrate and the flexible sheets which are adhered thereto.

66. The method according to claim 65, including the step of providing a substance that is interactable with a fluid on the substrate in regions constituting the lower ends of the utensils prior to adhering both flexible sheets to the lower segment of the substrate.

67. The method according to claim 66, wherein said substance is provided by adhering it to at least one flat surface of the substrate in regions constituting the lower ends of the utensils.

68. The method according to claim 67, wherein said substance is adhered to said at least one flat surface by coating it on said surface.

69. The method according to claim 67, wherein said substance is a coating of a fluid-dissolvable material.

70. A method of forming a plurality of packaged units, each unit including a utensil and a protective sheath therefor; each utensil including an upper gripping end and a lower end extending generally downwardly from the gripping end; said units being formed from a thin, substantially flat substrate and a pair of flexible sheets; said method comprising the following steps:

A. cutting said substrate intermediate upper and lower edges thereof to form a plurality of lower ends, each lower end having a bottom margin and upwardly extending diverging side margins, the bottom and side margins of each lower end being transversely spaced from the bottom margin and adjacent side margins of adjacent lower ends, a plurality of said lower ends being continuous downwardly directed extensions of a continuous, transversely extending upper segment of said substrate, and bottom and side margins of the lower ends being surrounded by a continuous, transversely extending lower segment of said substrate;

B. providing a substance that is interactable with a fluid on the substrate at transversely spaced locations corresponding to regions of the substrate constituting the lower ends, and subsequent to said cutting and coating steps, carrying out the following steps sequentially;

C. positioning the sheets in overlying relationship with opposed flat surface of each said lower ends and the lower segment of the substrate;

D. adhering the flexible sheets to opposed flat surfaces of the lower segment of the substrate in the regions surrounding each said lower ends; and E. severing the substrate and adhered sheets intermediate adjacent side margins of adjacent treating ends to interrupt the transversely extending continuity of the upper and lower segments of the substrate and the sheets adhered thereto to thereby form a plurality of discrete packaged units.

71. The method according to claim 70, wherein the substance is provided by coating it on the substrate.

72. The method according to claim 70, including the step of applying desired identifying indicia on a flat surface of the substrate.

73. The method according to claim 70, including the step of adhering said flexible sheets to the lower segment of the substrate in a manner such that at least a portion of the upper segment of the substrate upwardly beyond the upper margin of each of said flexible sheets.

74. The method according to claim 73, including the step of adhering the flexible sheets to opposed flat surfaces of the substrate with the upper margin of one flexible sheet disposed below the upper margin of the other flexible sheet.

75. The method according to claim 70, including the step of connecting the utensil to the protective sheath.

76. The method according to claim 75, wherein the step of connecting the utensil to the protective sheath is accomplished by bonding at least one of the flexible sheets to the utensil.

77. The method according to claim 75, wherein the step of connecting the utensil to the protective sheath is accomplished by leaving at least one connecting substrate tab between the lower end of the utensil and the lower segment of the substrate in the cutting step.

78. The method according to claim 70, including the step of contouring upper and lower edges of said substrate.

79. The method according to claim 78, wherein said contouring step is carried out simultaneously with said severing step.

80. The method according to claim 78, wherein said step of contouring the upper and lower edges of the substrate is accomplished prior to the severing step in which the individual packaged units are separated from the substrate and adhered flexible sheets.

81. The method according to claim 80, wherein said contouring step is carried out simultaneously with the cutting step.

82. A method of forming a packaged treating unit including a treating utensil and a protective sheath, said treating utensil including a lower treating end and an upper gripping end, said unit being formed from a thin, substantially flat substrate and a pair of flexible sheets, said method comprising the steps of:

A. cutting a portion of said substrate intermediate upper and lower margins thereof to form the lower treating end of the utensil which remains integral with an upper end of the substrate that constitutes the upper gripping end of the utensil; said cutting step forming the treating end with a bottom margin, and side margins extending upwardly from the bottom margin and diverging from each other in a direction from the bottom margin to the upper gripping end of the utensil; said bottom and side margin being surrounded by a portion of said substrate;

B. providing a substance that is interactable with a fluid on the treating end of the utensil, and subsequent to said cutting and providing steps;

C. adhering the flexible sheets to opposed flat surfaces of the portion of the substrate surrounding the bottom and side margins of the treating end of the utensil in overlying relationship with said treating end to form, with said substrate, a laminated protective sheath for the treating end of the utensil.

83. The method according to claim 82 wherein the substance is provided by coating it on the treating end.

84. A packaged unit including a thin, substantially flat utensil having an upper gripping end and a lower end, having a different configuration than said upper end, extending downwardly therefrom, said lower end being integral with and longer than said gripping end, said lower end being in a protective sheath which includes (a) a substantially flat rigidifying member of substantially the same thickness as the lower end of the utensil and having a recess extending inwardly from an upper margin for receiving the lower end of said utensil therein, and (b) flexible sheet material adhered to the rigidifying member and overlying the recess and lower end of the utensil, said gripping end of the utensil having a transverse dimension substantially equal to the transverse dimension of the protective sheath.

* * * * *